US012469988B2

(12) United States Patent
Martin

(10) Patent No.: US 12,469,988 B2
(45) Date of Patent: Nov. 11, 2025

(54) DIRECT CONNECTOR FOR FLAT FLEXIBLE CABLE

(71) Applicant: TE Connectivity Solutions GmbH, Schaffhausen (CH)

(72) Inventor: Galen M. Martin, Middletown, PA (US)

(73) Assignee: TE Connectivity Solutions GmbH (CH)

(*) Notice: Subject to any disclaimer, the term of this patent is extended or adjusted under 35 U.S.C. 154(b) by 419 days.

(21) Appl. No.: 17/971,013

(22) Filed: Oct. 21, 2022

(65) Prior Publication Data

US 2024/0136738 A1 Apr. 25, 2024
US 2024/0235066 A9 Jul. 11, 2024

(51) Int. Cl.
*H01R 4/24* (2018.01)
*H01R 4/2406* (2018.01)
*H01R 12/59* (2011.01)

(52) U.S. Cl.
CPC ......... *H01R 4/2406* (2018.01); *H01R 12/592* (2013.01)

(58) Field of Classification Search
CPC ...... H01R 4/24-2495; H01R 12/59-69; H01R 12/79; H01R 4/2433
See application file for complete search history.

(56) References Cited

U.S. PATENT DOCUMENTS

| | | | | |
|---|---|---|---|---|
| 9,252,516 | B2 * | 2/2016 | Ashibu | H01R 12/77 |
| 9,871,306 | B2 * | 1/2018 | Mizusawa | H01R 12/88 |
| 2024/0283208 | A1 * | 8/2024 | Semilia | H01R 4/2412 |

OTHER PUBLICATIONS https://www.te.com/usa-en/products/connectors/pcb-connectors/wire-to-board-connectors/ffc-fpc-ribbon-connectors/fpc-connectors.html?—FPC Connectors, © 2023 TE Connectivity, downloaded Mar. 20, 2023, 14 pages.

* cited by examiner

*Primary Examiner* — Ross N Gushi

(57) ABSTRACT

A connector for a flat flexible cable (FFC) has a terminal holder adapted to be mounted to a substrate, and a plurality of terminals arranged within the terminal holder. Each terminal defines a plurality of sharpened tines arranged in a row. A cable holder is slidably arranged on the terminal holder and movable between an insertion position wherein an FFC is free to be inserted into the cable holder, and an installed position wherein the tines of each terminal engage with or penetrate conductors of the FFC arranged within the cable holder for establishing electrical contact therewith.

20 Claims, 8 Drawing Sheets

DIRECT CONNECTOR FOR FLAT FLEXIBLE CABLE

FIELD OF THE INVENTION

The present invention relates to electrical connectors, and more particularly, to a connector for a flat flexible cable.

BACKGROUND

As understood by those skilled in the art, flat flexible cables (FFCs) or flat flexible circuits are electrical components consisting of at least one conductor (e.g., a metallic foil conductor) embedded within a thin, flexible strip of insulation. Flat flexible cables are gaining popularity across many industries due to advantages offered over their traditional "round wire" counter parts. Specifically, in addition to having a lower profile and lighter weight, FFCs enable the implementation of large circuit pathways with significantly greater ease compared to a round wire-based architectures. As a result, FFCs are being considered for many complex and/or high-volume applications, including wiring harnesses, such as those used in automotive manufacturing. A critical obstacle preventing the implementation of FFCs into these applications includes the need to develop quick, robust, and low resistance termination techniques which enable the relatively fragile FFC to be mating with various components, including substrates such as printed circuit boards (PCBs).

Accordingly, cost effective and reliable solutions for terminating FFC assemblies are desired.

SUMMARY

In one embodiment of the present disclosure, a connector for a flat flexible cable (FFC) has a terminal holder adapted to be mounted to a substrate, and a plurality of terminals arranged within the terminal holder. Each terminal defines a plurality of sharpened tines arranged in a row. A cable holder is slidably arranged on the terminal holder and movable between an insertion position wherein an FFC is free to be inserted into the cable holder, and an installed position wherein the tines of the terminals engage with or penetrate conductors of the FFC arranged within the cable holder for establishing electrical contact therewith.

BRIEF DESCRIPTION OF THE DRAWINGS

The invention will now be described by way of example with reference to the accompanying Figures, of which.

DETAILED DESCRIPTION OF THE EMBODIMENTS

Figure 1:
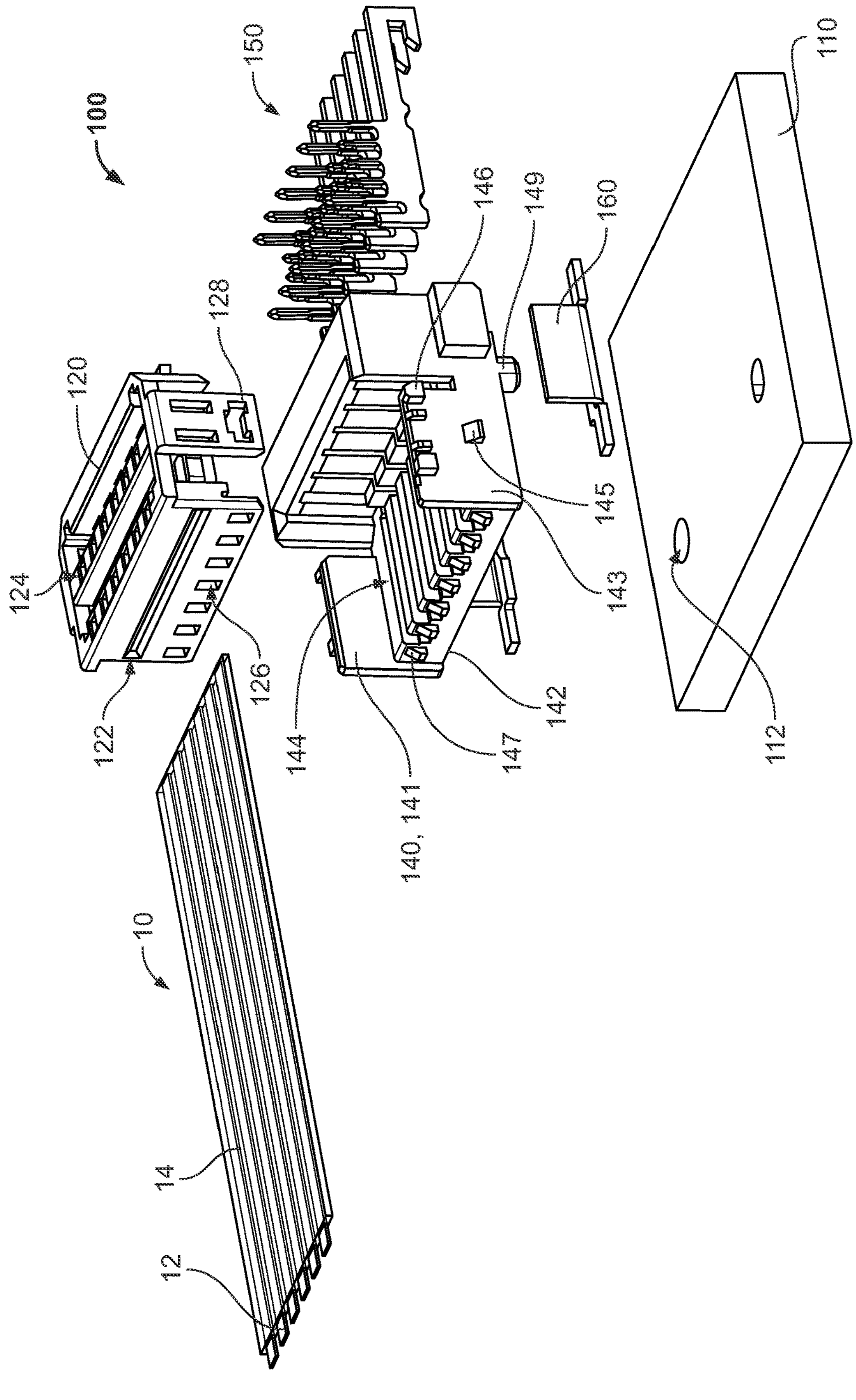
FIG. 1 is an exploded view of a direct FFC connector assembly according to an embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
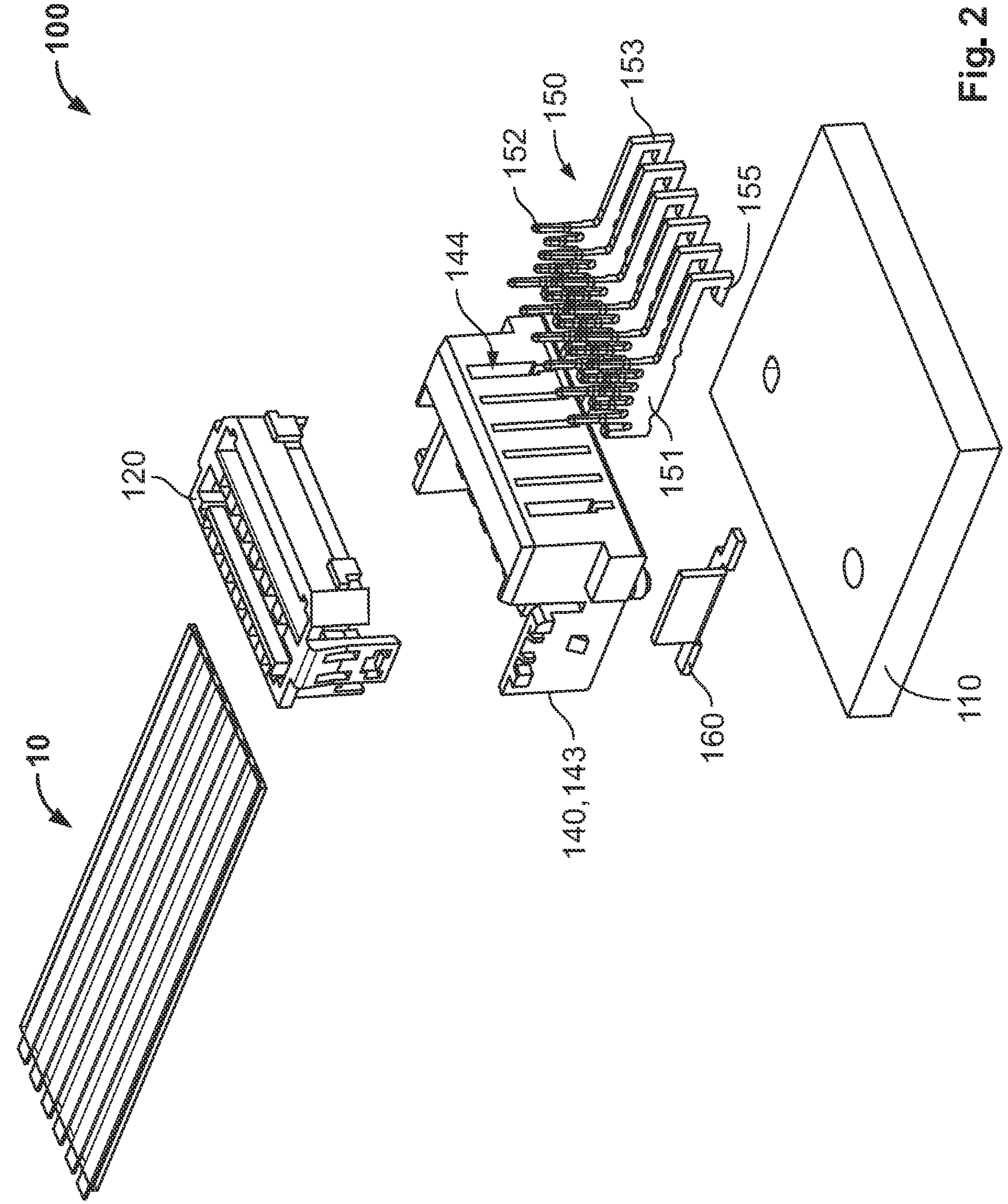
FIG. 2 is another exploded view of the connector assembly of FIG. 1.

FIGS. 1 and 2 are exploded views of an exemplary FFC connector assembly 100 according to an embodiment of the present disclosure. The assembly includes an exemplary segment of a flat flexible cable (FFC) 10 to be operably electrically connected to a substrate 110, such as a printed circuit board (PCB). The exemplary FFC 10 includes a plurality of conductors 12 embedded within an insulating material 14. The conductors 12 may comprise metallic sheet or foil, such as copper foil, by way of example only, patterned in any desirable configuration. The insulating material 14, such as a polymer insulating material, may be applied to either side of the conductors 12 via an adhesive, resulting in an embedded conductor arrangement.

The assembly 100 further includes an FFC connector including a cable holder 120 receiving the FFC 10, and a terminal holder 140. The terminal holder 140 is adapted to be installed onto the substrate 110, with conductive terminals 150 thereof in electrical communication with conductive portions of the substrate 110 (e.g., conductive pads or traces). In other embodiments, the terminal holder 140 may be mounted via holes (e.g., conductive holes) formed in the substrate 110, with corresponding protruding features (e.g., conductive features) of the terminal holder soldered and/or press-fit therein. The cable holder 120 is adapted to be movably installed onto the terminal holder 140, and engage the conductors 12 of the FFC 10 with the terminals 150, as will be set forth in greater detail herein.

The terminal holder 140 comprises an insulating body defining a plurality of terminal holding slots 144 formed into a base 142 thereof. A pair of sidewalls 141,143 extend from each side of the base 142, and define a cable receiving space into which the FFC 10 and the cable holder 120 will be received in an installed position thereof (see FIGS. 5-7). A catch 145 forms a portion of a lock and is provided on either or both sidewalls 141,143 of the body for engaging with the cable holder 120 and fixing it in the installed position. Guide protrusions 146 are also formed on each sidewall 141,143, guiding motion of the cable holder 120 relative to the holder 140 in a vertical direction relative to the orientation of the assembly 100 shown in FIGS. 1-7. A plurality of catches 147 are formed on a front of the base 142 for further securing the cable holder 120 in the installed position. A pair of distinctly shaped protrusions 149 are formed on an underside of the base 142, and may correspond to locating holes 112 formed in the substrate 110. As set forth above, the protrusions 149 and the holes 112 (or similar additional features) may serve to electrically connect the terminal holder 140 to the substrate 110. Further, a pair of mounts or mounting tabs 160 may be arranged on the substrate 110 for supporting and/or securing the terminal holder 140 thereon.

The plurality of blade-like terminals 150 are held within the terminal holder 140. Each terminal 150 includes a main body 151 having a plurality of sharpened tines or prongs 152 extending vertically therefrom. The tines 152 are arranged in a row or along a linear line. In the exemplary embodiment, each terminal 150 includes 5 tines, including 1 longer tine arranged on either side of 3 shorter tines in each row, or on each terminal. As shown in FIG. 2, the terminals 150 are loaded into respective slots or openings 144 of the terminal holder 140 from a rear side thereof. Each rear end of the slots or openings 144 is sized to accommodate the terminals 150, and specifically the tines 152 thereof in a height direction. A hook-shaped end 153 extends from a rear of the main body 151 and is adapted to receive or capture a portion of the terminal holder 140 therein (see FIG. 7). A downward facing end surface 155 of each hook end 153 may be electrically connected to a conductive trace or pad formed on the substrate 110, such as via soldering, as would be understood by one of ordinary skill in the art.

The cable holder 120 has a body sized to fit generally between the sidewalls 141,143 in a sliding manner. As shown in FIG. 1, the holder 120 includes a slotted cable opening or slot 122 sized to receive the FFC 10. The slot 122 extends into the body of the holder 120 to a depth in which it passes over and/or through a plurality of terminal-receiving guide openings 124. A plurality of front openings 126 extend downwardly from the body and are adapted to act as latches, receiving the plurality of catches 147 of the terminal holder 140. Two latching tabs 128 are formed on either side of the cable holder 120 and form another portion of the locks. The Tabs 128 engage with the catches 145 on either sidewall 141,143 of the terminal holder 140 for locking the cable holder in the installed position. Surfaces of the tabs 128 are guided in the vertical direction(s) by the guide protrusions 146.

Figure 3:
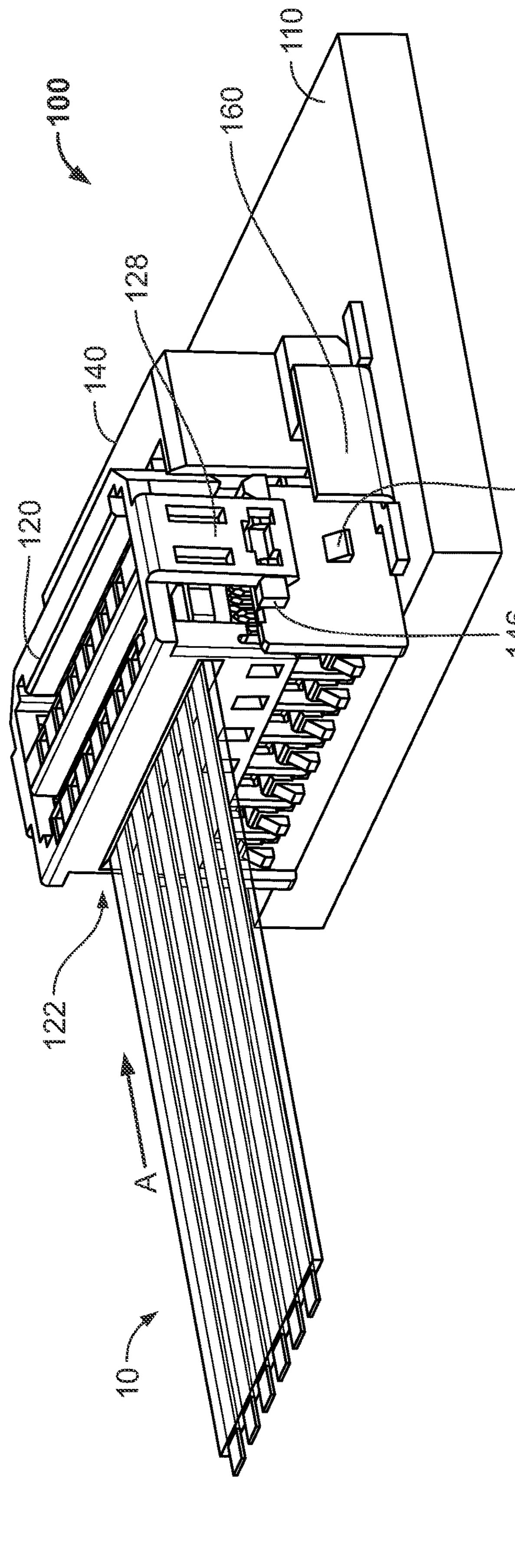
FIG. 3 is a perspective view of the connector assembly of FIGS. 1 and 2 in an insertion position.
Figure 4:
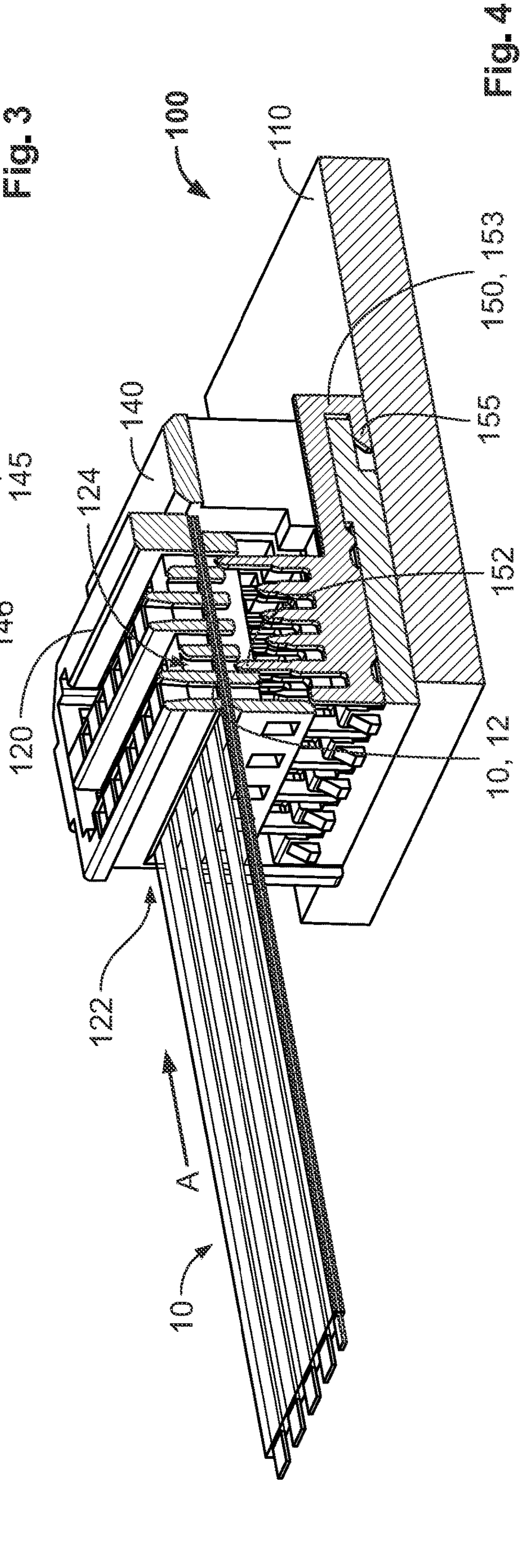
FIG. 4 is cross-sectional view of the connector assembly of FIG. 3.

FIGS. 3 and 4 illustrate the connector assembly 100 in an insertion position, in which the FFC 10 is free to be inserted into the cable holder 120 in an insertion direction A without interference from the terminals 150 or tines 152 thereof. The insertion direction A is parallel to the mounting surface of the substrate 110 on which the terminal holder 140 is secured via the mounting tabs 160. With reference to FIG. 4, with the FFC 10 installed within the cable holder 120, the tines 152 of each terminal 150 are vertically aligned with a respective conductor 12 of the FFC 10. Moreover, the guide openings 124 of the cable holder 120 are aligned with the tines 152 of the terminals 150. The hook end 153 of each terminal 150 is shown receiving a portion of the terminal holder 140. Further, an underside 155 of the hook end 153 is electrically connected (e.g., soldered) to a conductive surface (e.g., a conductive pad) of the substrate 110.

Figure 5:
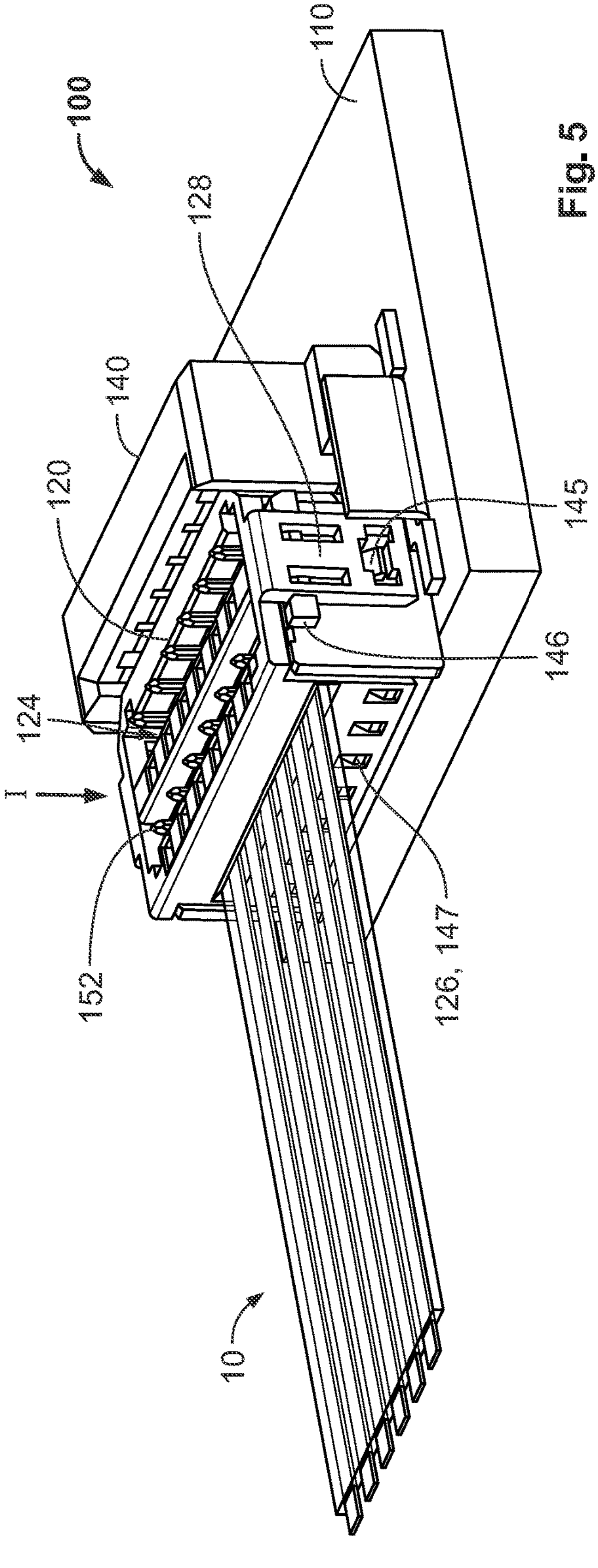
FIG. 5 is a perspective view of the connector assembly of FIG. 3 in an installed position.
Figure 6:
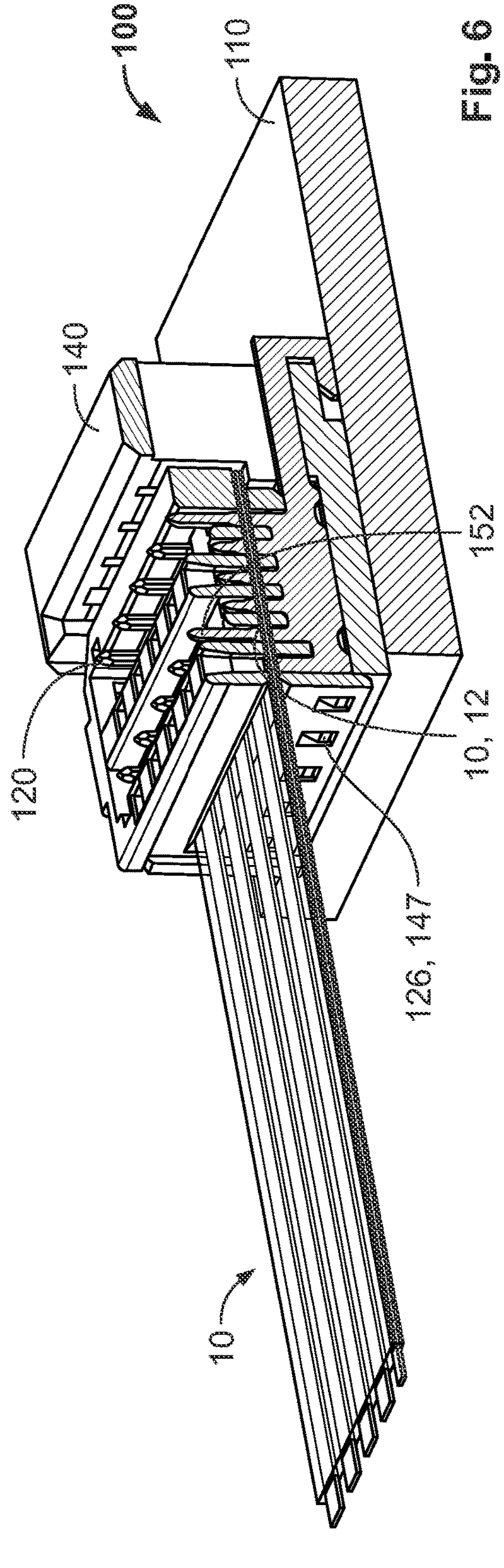
FIG. 6 is cross-sectional view of the connector assembly of FIG. 5.
Figure 7:
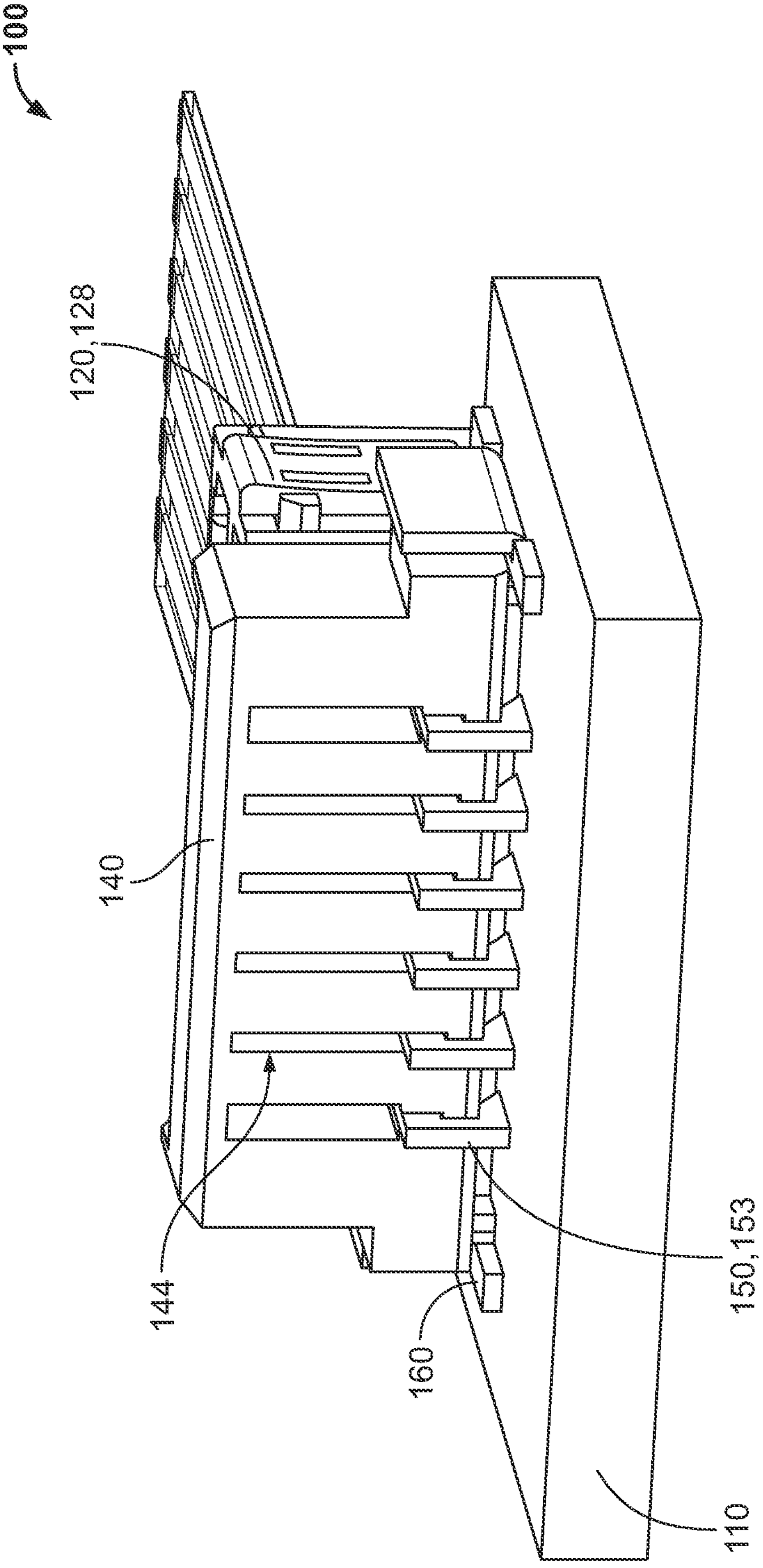
FIG. 7 is a rear perspective view of the connector assembly of FIG. 5.

Referring now to FIGS. 5-7, the connector assembly 100 is shown in an installation or installed position (i.e., a connected position) achieved via a downward force placed on the cable holder 120 in the indicated direction I, or generally perpendicular to the surface of the substrate 110. In the installed position, the conductors 12 of the FFC 10 have been electrically connected to the terminals 15, and thus the substrate 110. Specifically, biasing the cable holder 120 downwardly inserts the tines 152 into the guide openings 124 and through the aligned conductors 12 of the FFC 10. The use of a plurality of tines 152 for each conductor 12 ensures strong mechanical and electrical connections, as well as increases reliability via the multiple points of electrical contact with each conductor 12. The latches and catches 128,145 and 126,147 are operative to secure the cable holder 120 in position relative to the terminal holder 140. FIG. 7 provides a rear view of the connector assembly 100. Specifically, each of the terminals 150 is shown inserted into the slots 144 of the terminal holder 140, with the hook ends 153 capturing a rear portion of the terminal holder. The mounts or mounting tabs 160 securely support the terminal holder 140 on the substrate 110.

Figure 8:
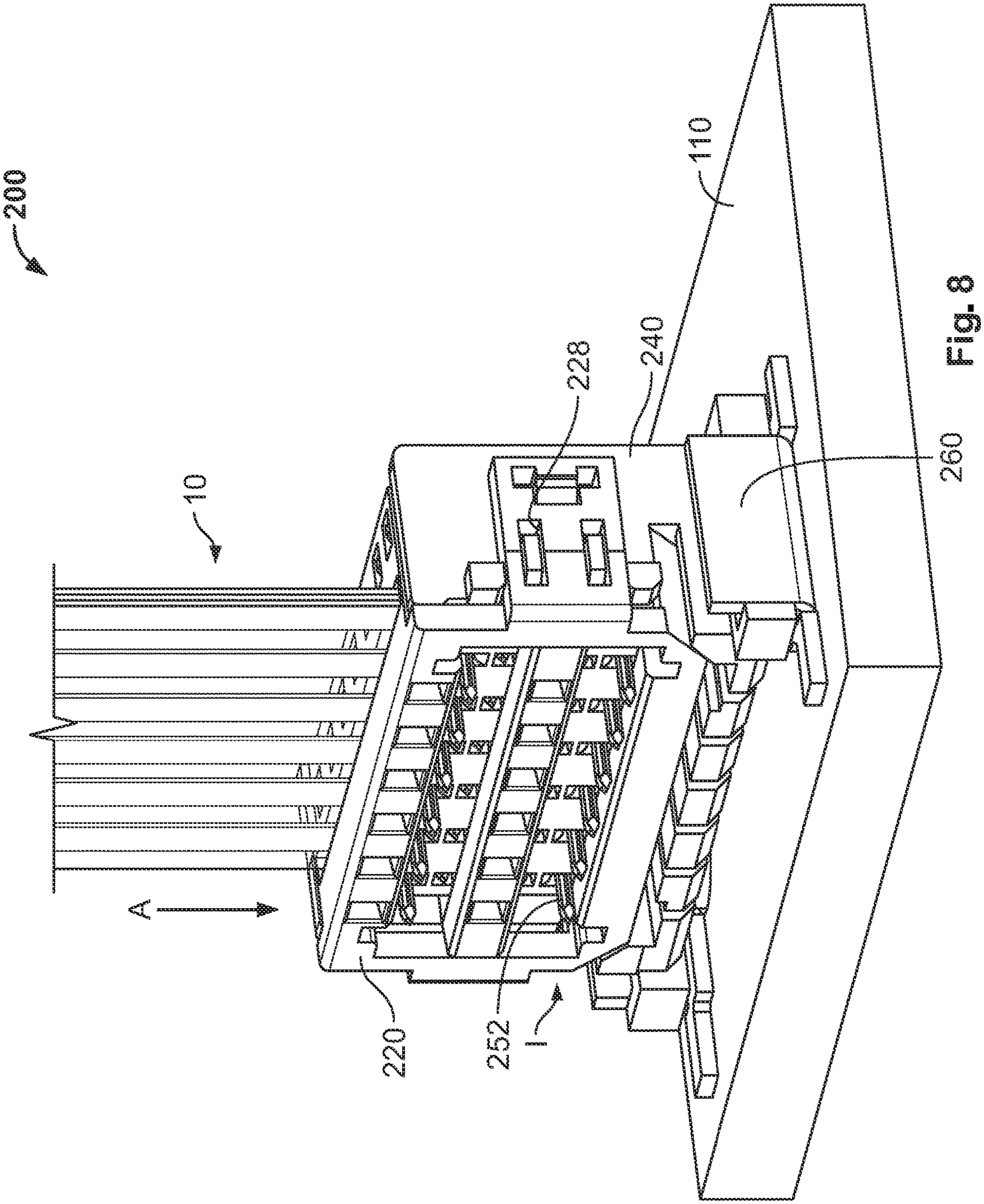
FIG. 8 is a perspective view of a connector assembly according to another embodiment of the present disclosure.
Figure 9:
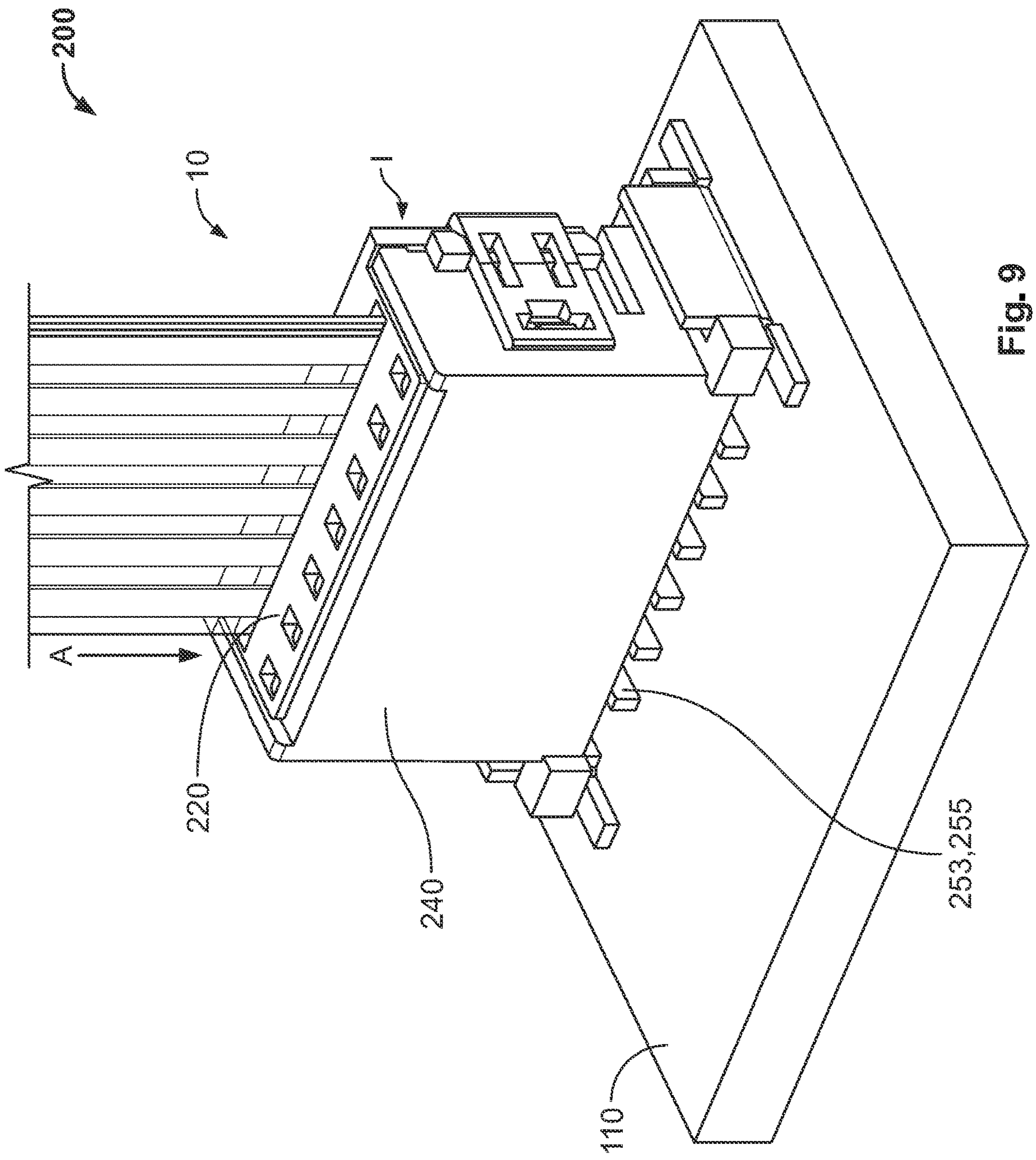
FIG. 9 is another perspective view of the connector assembly of FIG. 8.
Figure 10:
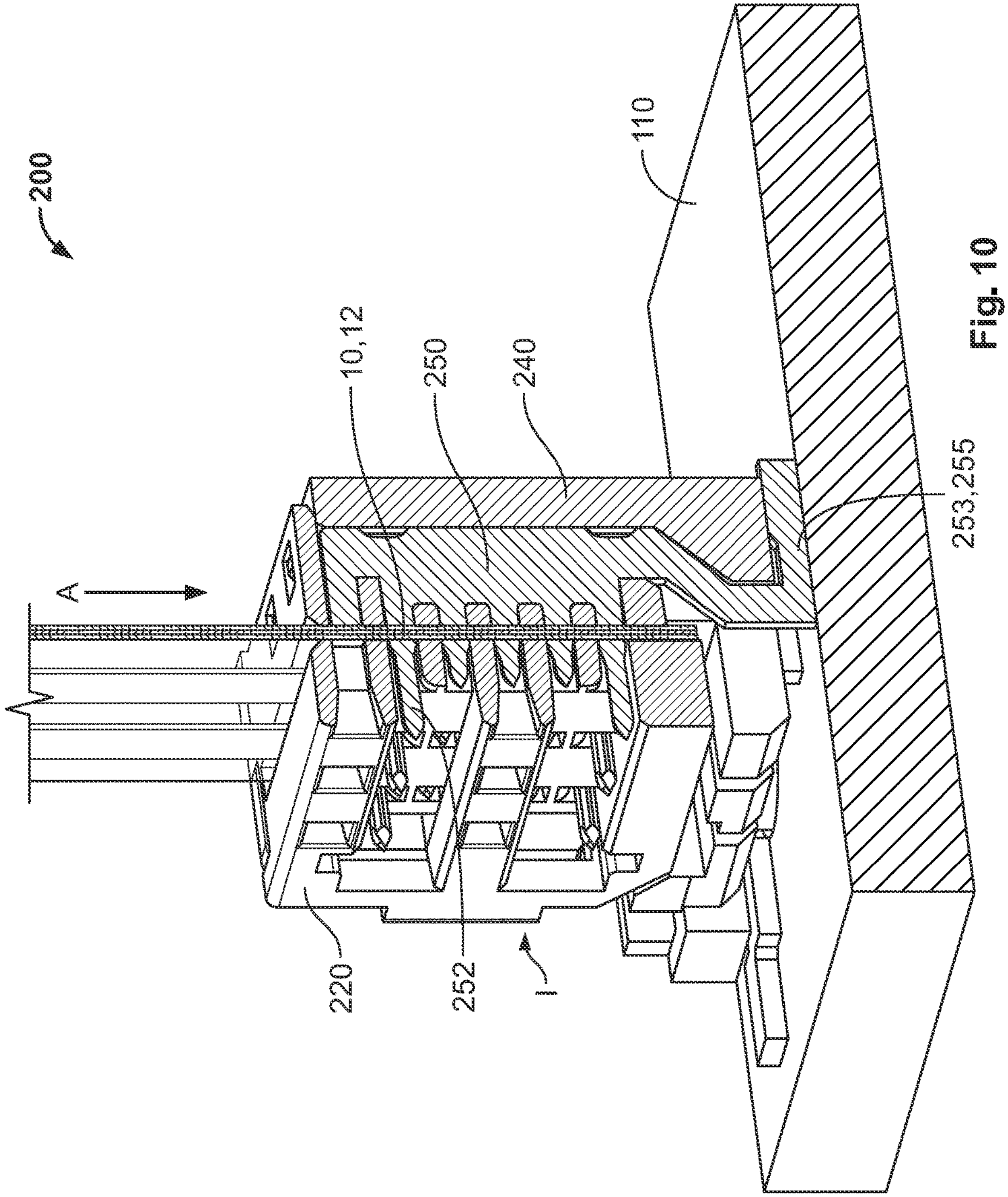
FIG. 10 is a cross-sectional view of the connector assembly of FIGS. 8 and 9.

Referring now to FIGS. 8-10, a second embodiment of the present disclosure includes a connector assembly 200. The connector assembly 200 comprises features similar to those of the embodiments of FIGS. 1-7, however, comprises a cable holder 220 and terminal holder 240 oriented generally vertically, or perpendicular relative to the orientation of the first embodiment. Specifically, the cable holder 220 is oriented such that the FFC 10 is inserted in a vertical direction A, generally perpendicular to the planar surface of the substrate 110. The illustrated installation position is achieved by biasing the cable holder 220 relative to the terminal holder 240 in the direction I, and parallel to the planar surface of the substrate 110. Like the proceeding embodiment, the cable holder 220 is locked into the installed position relative to the terminal holder 240 via a locking latch 228. The terminal holder 240 is fixed and located relative to the substrate 110 via a mounting tab or bracket 260. In the exemplary embodiment, a housing of the terminal holder 240 defines a slot into which an upwardly extending portion of the bracket 260 is received. While the connector of the assembly 200 is shown only in the installed position, it should be understood that the cable holder 220 is movable (i.e., horizontally in the orientation shown) in the same manner as the cable holder 120 of the first embodiment of the present disclosure.

As shown most clearly in FIG. 10, the terminal 250 comprises a profile distinct from that of the terminal 150. Specifically, the terminal 250 comprises a plurality of tines 252 similar in size and orientation compared to those of the terminal 150. However, the terminal 250 defines a lower leg 253 oriented parallel to the planar surface of the substrate 110. A bottom surface 255 of the lower leg 253 is electrically connected to the substrate 110, similar to that of the terminal 150.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments “comprising” or “having” an element or a plurality of elements having a particular property may include additional such elements not having that property.

What is claimed is:

1. A connector for a flat flexible cable (FFC), comprising:
a terminal holder adapted to be mounted to a substrate;
a plurality of terminals arranged within the terminal holder, each terminal defining a plurality of tines arranged in a row;
a cable holder slidably arranged on the terminal holder and movable between an insertion position wherein an FFC is free to be inserted into the cable holder, and an installed position wherein the plurality of tines of the plurality of terminals are adapted to engage with conductors of the FFC arranged within the cable holder;
a lock adapted to fix the cable holder in the installed position relative to the terminal holder; and
a plurality of secondary locking features including a plurality of corresponding latches and catches formed on front portions of the cable holder and the terminal holder.

2. The connector of claim 1, wherein the terminal holder defines a plurality of slots, each slot receiving one of the terminals.

3. The connector of claim 2, wherein each terminal is installed into the terminal holder through an open end of a respective one of the slots defined at a rear of the terminal holder, at least a portion of each of the plurality of slots is formed through the terminal holder and defines an opening closed about its perimeter.

4. The connector of claim 3, wherein each terminal defines a hook-shaped end receiving a portion of the terminal holder with the terminal in an installed position within the terminal holder.

5. The connector of claim 2, wherein each terminal comprises a planar body oriented generally vertically within each slot.

6. The connector of claim 1, wherein the plurality of tines of each terminal are aligned linearly in a row, with each row positioned to align with a conductor of the FFC arranged within the cable holder.

7. The connector of claim 1, wherein the cable holder defines a plurality of guide openings arranged in rows corresponding in location to the plurality of tines such that, in the installed position, each of the plurality of tines is received within a respective guide opening.

8. The connector of claim 1, further comprising a guide for controlling motion of the cable holder relative to the terminal holder between the insertion position and the installed position.

9. The connector of claim 8, wherein at least a portion of the lock forms at least a portion of the guide.

10. The connector of claim 9, wherein the lock comprises:
a latching tab formed on the cable holder; and
a corresponding catch formed on the terminal holder.

11. The connector of claim 10, wherein the guide comprises:
the latching tab of the cable holder; and
a guide protrusion formed on the terminal holder.

12. A connector assembly, comprising:
a substrate;
a terminal holder mounted on the substrate and including a plurality of terminals arranged therein, each terminal defining a plurality of conductive prongs arranged in a row;
a cable holder slidably mounted to the terminal holder and movable between an insertion position and an installed position; and
a flat flexible cable (FFC) inserted into the terminal holder, in the insertion position the plurality of prongs of each terminal aligned with a respective one of a plurality of conductors of the FFC, in the installed position the plurality of prongs of each terminal piercing one of the plurality of conductors of the FFC, wherein the FFC is insertable into the cable holder in an insertion direction, and the cable holder is movable relative to the terminal holder in an installation direction generally perpendicular to the insertion direction, the insertion direction perpendicular to a planar surface of the substrate on which the terminal holder is mounted.

13. The connector assembly of claim 12, wherein each terminal is electrically connected to a corresponding conductive element formed on the substrate.

14. The connector assembly of claim 12, wherein the terminal holder is located on the substrate via a pair of mounting tabs.

15. The connector assembly of claim 12, wherein the FFC is inserted into the cable holder in a direction opposite to an installation direction of the plurality of terminals into the terminal holder.

16. A connector for a flat flexible cable (FFC), comprising:
a terminal holder adapted to be mounted to a substrate and defining a plurality of openings formed through at least a portion of the terminal holder;
a plurality of terminals arranged within the plurality of openings of the terminal holder, each terminal defining a plurality of tines arranged in a row on a first end thereof, and a planar contact surface adapted to engage with a conductor formed on a planar surface of the substrate on a second end thereof, the second end of the terminal including the planar contact surface protruding from the terminal holder;
a cable holder slidably arranged on the terminal holder and movable between an insertion position wherein an FFC is free to be inserted into the cable holder, and an installed position wherein the plurality of tines of the plurality of terminals are adapted to engage with conductors of the FFC arranged within the cable holder;
a lock adapted to fix the cable holder in the installed position relative to the terminal holder; and
a plurality of secondary locking features including a plurality of corresponding latches and catches formed on front portions of the cable holder and the terminal holder.

17. The connector of claim 16, wherein the FFC is insertable into the cable holder in an insertion direction, and the cable holder is movable relative to the terminal holder in an installation direction generally perpendicular to the insertion direction.

18. The connector of claim 17, wherein the second ends of each of the plurality of terminals protrudes from a rear of the terminal holder in the insertion direction.

19. The connector of claim 18, wherein the insertion direction is perpendicular to the planar contact surface of each of the plurality of terminals so as to be parallel to the planar surface of the substrate.

20. The connector of claim 16, wherein each of the plurality of openings of the terminal holder defines a slot closed about a perimeter thereof.

* * * * *